(12) United States Patent
Lin

(10) Patent No.: US 6,545,674 B1
(45) Date of Patent: Apr. 8, 2003

(54) METHOD OF SELECTIVELY RENDERING GRAPHIC OBJECTS THREE-DIMENSIONAL

(75) Inventor: Tsung-Wei Lin, Taipei (TW)

(73) Assignee: Ulead Systems, Inc., Taipei (TW)

( * ) Notice: Subject to any disclaimer, the term of this patent is extended or adjusted under 35 U.S.C. 154(b) by 0 days.

(21) Appl. No.: 09/290,934

(22) Filed: Apr. 13, 1999

(30) Foreign Application Priority Data

Dec. 4, 1998 (TW) ......................................... 87120176 A

(51) Int. Cl.$^7$ ................................................. G06T 15/00
(52) U.S. Cl. ........................................ 345/419; 345/441
(58) Field of Search ................................. 345/419, 441, 345/440, 433, 442, 629, 581

(56) References Cited

U.S. PATENT DOCUMENTS 5,828,380 A  10/1998  Lin ............................. 345/441

6,204,860 B1 * 3/2001 Singh ......................... 345/433

FOREIGN PATENT DOCUMENTS

JP           299413         7/1985

* cited by examiner

*Primary Examiner*—Mark Zimmerman
*Assistant Examiner*—Huedung X. Cao
(74) *Attorney, Agent, or Firm*—Birch, Stewart, Kolasch & Birch, LLP

(57) ABSTRACT

The method of selectively rendering graphic objects three-dimensional of the present invention is realized by acquiring a relative position between each pixel of the 2-D graphic object and the outer closed curve $v^{out}$ through the definition of an internal closed curve $v^{in}$ and an outer closed curve $v^{out}$. Then, by selecting with a mask the area to display 3-D effects, a directional relation is obtained. Next, z-axis parameters corresponding to each pixel are generated with an effect function and a corresponding selective 3-D graphic object is rendered based upon the 2-D graphic object and the z-axis parameters by means of ERM functions.

10 Claims, 5 Drawing Sheets

METHOD OF SELECTIVELY RENDERING GRAPHIC OBJECTS THREE-DIMENSIONAL

BACKGROUND OF THE INVENTION

1. Field of the Invention

The present invention generally relates to computer graphics. More particularly, the present invention relates to a method of selectively rendering graphic objects three-dimensional (3D) by relation map function.

2. Description of the Related Art

The growing popularity of computers has enabled conventional film clips, graphics and pictures to be digitized for computer processing, allowing special visual effects never before possible. Computer imaging or graphing is also gaining a foothold in almost every profession because of the widespread use of computers. However, the restricted features of the video display and the computer have made typical computer applications more suitable for processing 2-D graphic objects and for presenting 2-D effects rather than for processing 3-D graphic objects and presenting 3-D effects.

The conventional method for achieving 3-D effect uses the polygonal approach. In said polygonal approach, a 2-D planar graphics is first determined and segmented into a plurality of polygons with computer operations. Then an interpolation operation is performed to change the associated color value of the pixels of each polygon to render 3-D visual effects. Generally speaking, the 2-D original graphic is usually composed of smooth curves of polynomials and the smooth and gradual visual effect is usually desired. Whereas, the effect of conventional method using plural polygons to change the color values of the pixels is not so satisfactory. For example, if not enough polygons applied, the zigzag distortion will happen on the lines corresponding to the curves of the 2-D original graphic. Thus, the visual effect is adversely affected.

In another way, if the applied polygons are increased to avoid the above-mentioned problem, the processing time will be considerably increased. Additionally, if different kinds of visual effects are desired on a 2-D original graphic, every corresponding segmenting way may be accordingly different and the processing time can be also increased.

Another processing method of rendering 3-D graphic effects with a 2-D graphic object is disclosed in the U.S. Pat. No. 5,828,380 assigned to Ulead Systems, Inc. In said processing method, a relation mapping function is first given for each pixel of the graphic to obtain the directional relation of the corresponding 2-D graphic object. The required 3-D imaging effects, such as generating the measurement of length corresponding to the third axis (i.e., z-axis), can be generated from the acquired directional relation through an effect function to actualize 3-D visual effects.

FIG. 1 illustrates the relation map function corresponding to several pixels of a picture as specified in U.S. Pat. No. 5,828,380. As shown in FIG. 1, a 2-D graphic object is composed of a ring-shaped area confined by closed curves P0 and P1. The 2-D graphic object is composed of numerous pixels, such as $A_1$, $A_2$, and $A_3$. In said processing method, a relation map function corresponding to pixels of the 2-D original graphics is first obtained, which represents a distance or a vector from every pixel to the corresponding edge of the closed curves P0 or P1 located closest thereto. In FIG. 1, the relation map function represents the directional relation of the vectors from every pixel to the edges located closest thereto, such as $\bar{v}_1$, $\bar{v}_2$, and $\bar{v}_3$.

Then, an effect function performs 3-D function of each vector $\bar{v}$ (corresponding to each pixel). In the effect function, a relation limit $d_{max}$ is defined, denoting a range of pixels within the distance $d_{max}$ from the edges of the 2-D graphic object. Only the pixels within $d_{max}$ range need 3-D modeling processing such as effect on relation map (ERM) functions, whereas the pixels in each range determine the realistic 3-D effects being displayed according to a predetermined contour curve.

FIGS. 2a–2c illustrate three possible contour curves in accordance with the effect function. FIG. 2a is a type of rounded bevel, with C1 denoting a contour curve, and the coordinate of the pixel (x,y) starting from the edge within a relation limit $d_{max}$ determines the corresponding coordinate on the axis z in accordance with said contour curve C1. Further, FIG. 2b is a type of straight bevel, with C2 denoting a contour curve; and FIG. 2c a combined type of two rounded bevels, with C3 denoting a contour curve.

Taking the rounded bevel type of FIG. 2a as an example, assume the distance from the coordinate of the pixel (x, y) to the edge of the corresponding edge is $L(=\sqrt{x^2+y^2})$; then the z-axis parameters of said pixel (x,y) can be determined as follows:

$$z = L \times \tan[\cos^{-1}((d_{max}-L)] \tag{1}$$

The computations of z-axis parameters under other circumstances can also be made in a similar manner. In other words, the z-axis coordinate corresponding to each pixel within the relation limit $d_{max}$ in the above contour curves can be calculated with mathematical equations.

Thus, the processing method of U.S. Pat. No. 5,828,380 can rapidly render a 3-D display with simple computations. However, the utilization of this method to selectively process 3-D graphic objects is burdensome.

SUMMARY OF THE INVENTION

Accordingly, it is an object of the present invention to provide a method to realize selective 3-D effects in a simpler manner.

The above object of this invention can be accomplished with a method of selectively rendering a 2-D graphic object having a plurality of closed curves three-dimensional. The closed curves are first defined as a unique outer closed curve and at least one inner closed curve, while the step of determining a mask in response to the closed curve follows. The mask is used to select a portion of the 2-D graphic object to be displayed in 3-D effects. Next, a directional relation is acquired in response to the outer closed curve and the mask. Then, z-axis parameters corresponding to pixels of the 2-D graphic object are generated in response to the directional relation. Therefore, a 3-D graphic object can be created in accordance with the 2-D graphic object and the z-axis parameters.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF PREFERRED EMBODIMENTS

Figure 3:
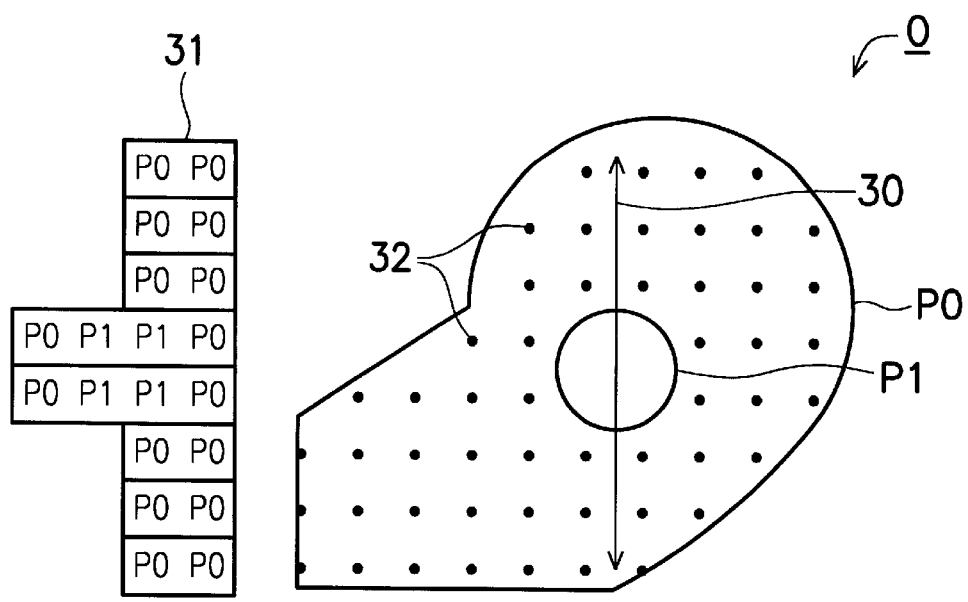
FIG. 3 is a diagram illustrating an outer closed curve and an inner closed curve as defined with an edge list.

In accordance with the present invention, a selected area of a graphic object displays 3-D effect. Typically, various areas of a 2-D graphic object O are defined by several closed curves. For example, the 2-D graphic object O as shown in FIG. 3 comprises various areas defined by the closed curves P0 and P1. The 2-D graphic object O includes a plurality of pixels 32 and the relevant information of each pixel 32, such as red, green, blue color data and alpha channel data, recorded by bit data of a predetermined length. Since the drawing is in black and white, the colors of the 2-D graphic object O are thereby omitted.

Since this invention renders selective 3-D display effects for various areas of a graphic object, an outer closed curve and an inner closed curve have to first be defined. The method of defining the outer closed curve and the inner closed curve can be performed, for example, with an edge list. Referring to FIG. 3, an edge list 31 defining a list, along a column direction 30, the closed curves by which those pixels 32 of each graphic row are left and right bounded. If a specific curve right and left bounds other curve in the edge list, such as of the P0 present at both the right and the left side of P1, in FIG. 3, then the closed curve P1 is defined as the inner closed curve $v^{in}$ and the closed curve P0 as the outer closed curve $v^{out}$. However, the method of defining an outer closed curve and an inner closed curve with an edge list is just one of the numerous applicable examples, and should not be used to restrict this invention.

In addition, there must exist a unique (qualifying) outer closed curve $v^{out}$, while there may exist several inner closed curves $v^{in}$, to apply the method of selective processing 3-D graphic object of this invention. If there is not an inner closed curve $v^{in}$ or a unique outer closed curve $v^{out}$, then this invention does not apply. Further, the combined set of the outer closed curve $v^{out}$ and the inner closed curve $v^{in}$ becomes the set of all closed curves v.

Figure 4:
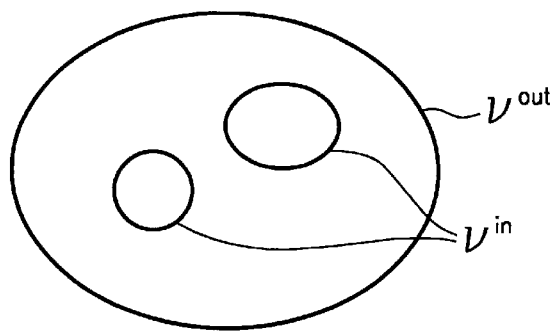
FIG. 4 illustrates a 2-D graphic object with only one existing outer closed curve $v^{out}$ and two inner closed curves $v^{in}$.
Figure 5:
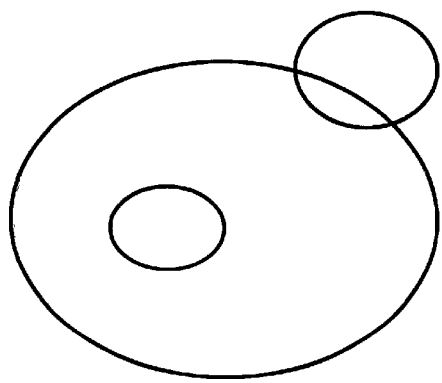
FIG. 5 illustrates a 2-D graphic object with non-qualifying outer closed curve $v_{out}$.

FIG. 4 illustrates a 2-D graphic object with one qualifying outer closed curve $v^{out}$ and two inner closed curves. FIG. 5 illustrates a 2-D graphic object with a non-qualifying outer closed curve $v^{out}$; therefore, this invention does not apply to the 2-D graphic object as shown in FIG. 5.

Selective 3-D effects for various areas of a graphic object can be obtained after the inner closed curve $v^{in}$ and the outer closed curve $v^{out}$ of a 2-D graphic are defined. In the following, two embodiments are specified.

First Embodiment

Figure 6A:
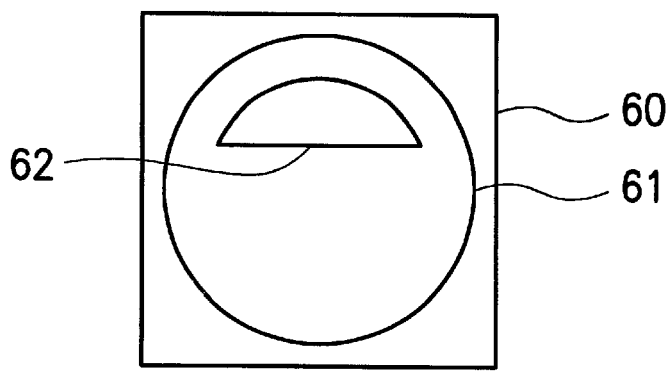
FIGS. 6a–6c are diagrams illustrating a first embodiment of this invention.

Referring to FIG. 6a, a diagram illustrating a first embodiment of this invention, wherein, the numeral 60 denotes the range of a 2-D graphic object. The 2-D graphic object of FIG. 6a comprises two closed curves 61 and 62, and only the circular area confined by the closed curves 61 and 62 are selected to show 3-D effect.

Figure 6B:
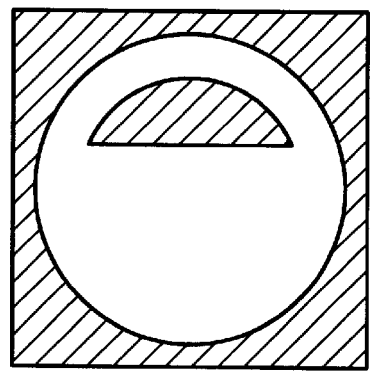

First, the closed curve 61 is known to be a unique (qualifying) outer closed curve $v^{out}$, and the closed curve 62 an inner closed curve $v^{in}$, based upon the method of defining the outer and inner closed curves with an edge list. The closed curves 61 and 62 form the set v of all closed curves. Then, a mask α is obtained with the 2D rendering function l(v) based upon the closed curve set v as shown in FIG. 6b. Simply put, said mask α is a set of alpha channels corresponding to all pixels of the 2-D graphic object. In other words, the circular area between the outer closed curve $v^{out}$ and the inner closed curve $v^{in}$ to be displayed in 3-D effect is highlighted in white, whereas other areas are highlighted in black.

Next, a directional relation is generated based upon the mask α and the outer closed curve $v^{out}$ with a relation map function. The relation map function is simply represented as $\Re$ that is, the directional relation $v=\Re(\alpha,v^{out})$ represents a relative position between each pixel of the 2-D graphic object and the edge of the outer closed curve $v^{out}$. In accordance with this invention, the relation map function $\Re$ addresses the relative position between the pixels and the edge of the outer closed curve $v^{out}$ rather than to all closed curves in the closed curves set v. The circular area between the outer closed curve $v^{out}$ and the inner closed curve $v^{in}$ is selected with mask α.

Figure 1:
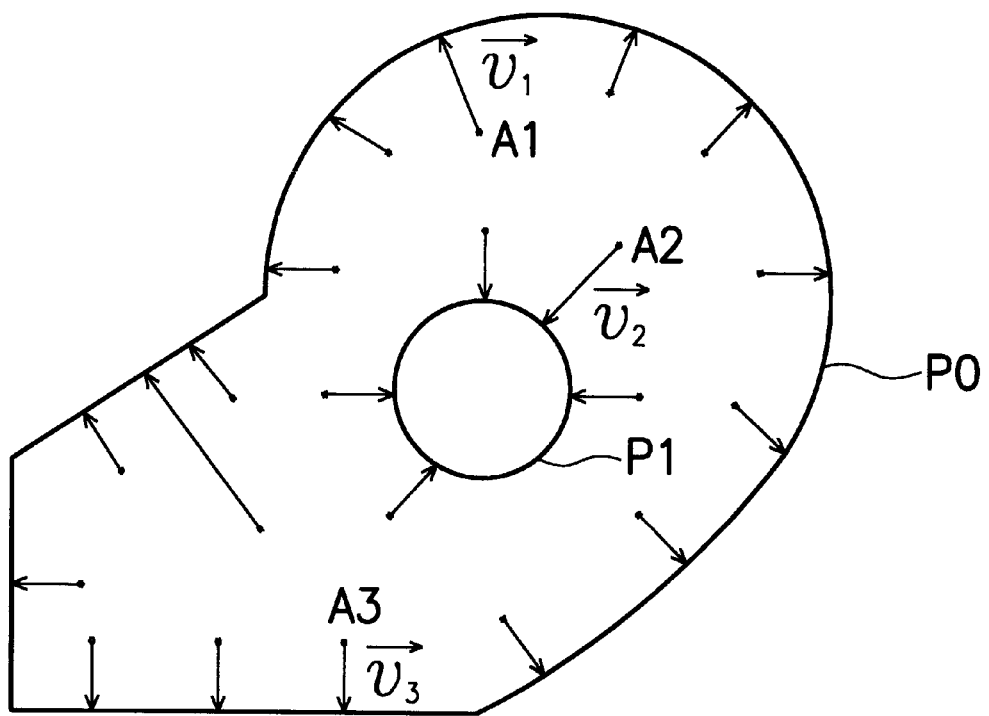
FIG. 1 illustrates the relation mapping function corresponding to several pixels of a picture as specified in U.S. Pat. No. 5,828,380.
Figure 2A:
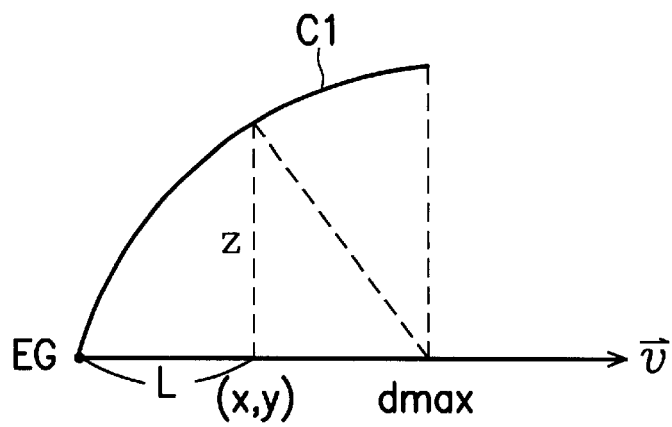
FIGS. 2(a)–2(c) are diagrams illustrating three possible contours used by a respective effect function, wherein (a) represents a rounded bevel, (b) a straight bevel, and (c) a dual-rounded bevel.
Figure 2B:
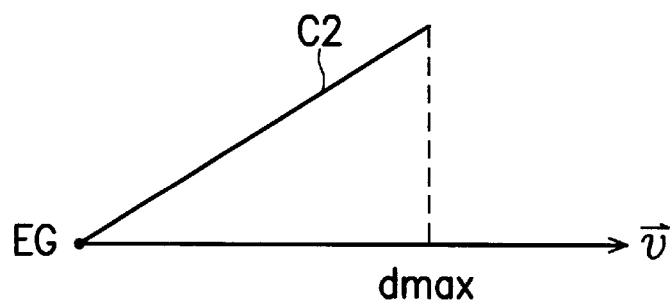
Figure 2C:
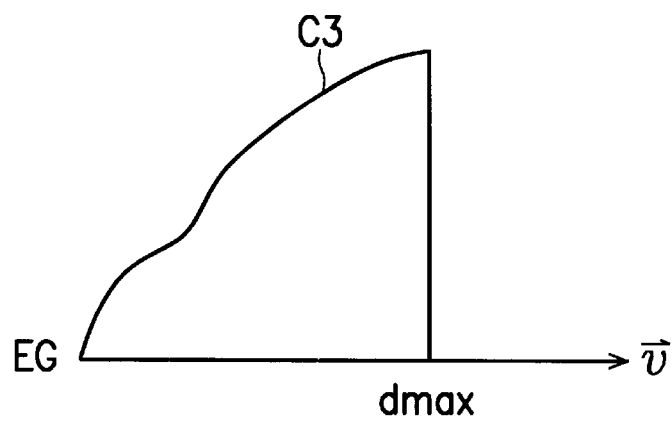
Figure 6C:
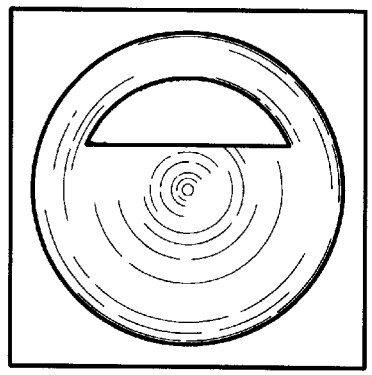

Further, z-axis parameters corresponding to each pixel are generated with an effect function E(v). The effect function E(v) comprises parameters for a relation limit $d_{max}$ and contour curves (such as the contour curves C1, C2 and C3 in FIGS. 2a–2c) for defining the z-axis parameters of each pixel based upon the edge but within the range of the relation limit $d_{max}$ on the z-axis. Then, a corresponding selective 3-D graphic object is rendered based upon the 2-D graphic object and the z-axis parameters by the ERM function. FIG. 6c illustrates a selective 3-D graphic object with a rounded bevel as the contour curve.

Second Embodiment

Figure 7A:
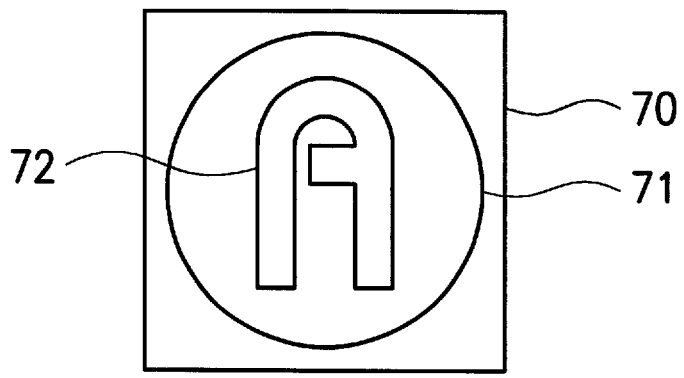
FIGS. 7a–7c are diagrams illustrating a second embodiment of this invention.

Refer to FIG. 7a, a diagram illustrating a second embodiment of this invention; wherein, the numeral 70 denotes the range of a 2-D graphic object. The 2-D graphic object of FIG. 7a comprises two closed curves 71 and 72, and only the circular area confined by the closed curve 72 is selected to show 3-D effect.

Figure 7B:
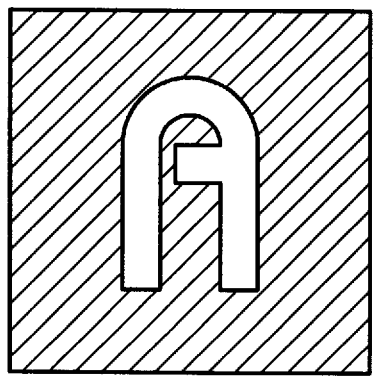

First, the closed curve 71 is known to be a unique (qualifying) outer closed curve $v^{out}$, and the closed curve 72 an inner closed curve $v^{in}$, based upon the method of defining the outer and inner closed curves with an edge list. The closed curves 71 and 72 form the set v of all closed curves. Then, a mask α is obtained with the 2D rendering function $l(v^{in})$ based upon the inner closed curves $v^{in}$ as shown in FIG. 7b. Simply put, said mask α highlights the circular area confined by the inner closed curve $v^{in}$ to be displayed in 3-D effect in white, and other areas in black.

Next, a directional relation is generated based upon the mask α and the outer closed curve $v^{out}$ with a relation map function. The relation map function is simply represented as $\Re$ that is, the directional relation $v=\Re(\alpha,v^{out})$ represents a relative position between each pixel of the 2-D graphic object and the edge of the outer closed curve $v^{out}$. In accordance with this invention, the relation map function $\Re$ addresses the relative position between the pixels and the edge of the outer closed curve $v^{out}$ rather than to all closed curves in the closed curves set v. The area confined by the inner closed curve $v^{in}$ is selected with mask α.

Figure 7C:
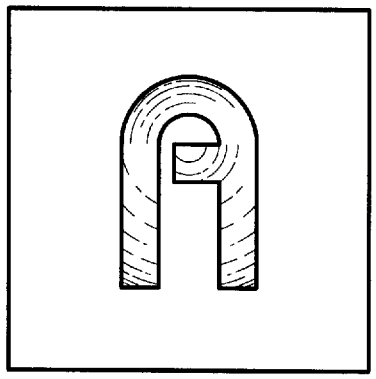

Further, z-axis parameters corresponding to each pixel are generated with an effect function E(v). The effect function E(v) comprises parameters for a relation limit $d_{max}$ and contour curves (such as the contour curves C1, C2 and C3 in FIGS. 2a–2c) for defining the z-axis parameters of each pixel from the edge but within the range of the relation limit $d_{max}$ on the z-axis. Then, a corresponding selective 3-D graphic object is rendered based upon the 2-D graphic object and the z-axis parameters by the ERM function. FIG. 7c illustrates a selective 3-D graphic object with a rounded bevel as the contour curve.

To summarize, the method of selectively rendering graphic objects three-dimensional of the present invention is realized by acquiring a relative position between each pixel of the 2-D graphic object and the outer closed curve $v^{out}$ through the definition of an internal closed curve van and an outer closed curve $v^{out}$. Then, by selecting with a mask the area to display 3-D effects, a directional relation is obtained. Next, z-axis parameters corresponding to each pixel are generated with an effect function and a corresponding selective 3-D graphic object is rendered based upon the 2-D graphic object and the z-axis parameters.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of selectively rendering a 2-D graphic object having a plurality of closed curves three-dimensional; said method comprising the following steps of:

(a) defining said closed curves as a unique outer closed curve and at least one inner closed (b) determining a mask to select a portion of said 2-D graphic object to be displayed in 3-D effects;

(c) acquiring a directional relation in selective response to said mask and one selected from the group consisting of at least one portion of said outer closed curve and at least one portion of said inner closed curve, said directional relation addressing relative position between pixels and said selected curve;

(d) generating z-axis parameters corresponding to pixels of said 2-D graphic object in response to said directional relation; and (e) generating a 3-D graphic object in response to said 2-D graphic object and said z-axis parameters.

2. The method as claimed in claim 1, wherein step (a) is performed with an edge list.

3. The method as claimed in claim 1, wherein said portion to be displayed in 3-D is an area confined by said outer closed curve and said at least one inner closed curve.

4. The method as claimed in claim 3, wherein step (b),is performed in response to said closed curves.

5. The method as claimed in claim 1, wherein said portion to be displayed in 3-D is an area confined by said at least one inner closed curve.

6. The method as claimed in claim 5, wherein step (b) is performed in response to said at least one inner closed curve.

7. The method as claimed in claim 1, wherein said directional relation defines relative positions of said outer closed curve closest to pixels of said 2-D graphic object.

8. The method as claimed in claim 1, wherein step (d) is accomplished with an effect function.

9. The method as claimed in claim 8, wherein said effect function renders said z-axis parameters responsive to a relation limit and a contour curve.

10. The method as claimed in claim 1, wherein steps (b) through (e) will not be performed when it is determined in step (a) that one or both of said unique outer closed curve and said at least one inner closed curve are not present.

* * * * *